United States Patent
Tsuda

[11] Patent Number: 6,050,313
[45] Date of Patent: Apr. 18, 2000

[54] PNEUMATIC TIRE HAVING SIPES INCLUDING AT LEAST THREE TIE-BARS

[75] Inventor: Satoshi Tsuda, Akashi, Japan

[73] Assignee: Sumitomo Rubber Industries, Ltd., Kobe, Japan

[21] Appl. No.: 08/970,391

[22] Filed: Nov. 14, 1997

[30] Foreign Application Priority Data

Nov. 21, 1996 [JP] Japan .................... 8-310937

[51] Int. Cl.⁷ ............. B60C 11/12; B60C 11/13; B60C 103/04
[52] U.S. Cl. ............. 152/209.18; 152/209.22; 152/903; 152/DIG. 3
[58] Field of Search ............. 152/209 R, 209 D, 152/DIG. 3, 209.18, 209.22, 903

[56] References Cited

U.S. PATENT DOCUMENTS

| | | | |
|---|---|---|---|
| 2,094,636 | 10/1937 | Bull | 152/DIG. 3 |
| 2,302,027 | 11/1942 | Havens | 152/DIG. 3 |
| 4,078,596 | 3/1978 | Nakayama et al. | 152/DIG. 3 |
| 4,471,825 | 9/1984 | Kuhn et al. | 152/209 R |
| 5,109,904 | 5/1992 | Numata et al. | 152/209 R |
| 5,287,905 | 2/1994 | Caretta et al. | 152/209 R |
| 5,355,922 | 10/1994 | Kogure et al. | 152/209 R |
| 5,388,625 | 2/1995 | White . | |
| 5,766,383 | 6/1998 | Hasegawa et al. | 152/208.18 |
| 5,772,806 | 6/1998 | Moriya | 152/DIG. 3 |
| 5,824,169 | 10/1998 | Landers et al. | 152/DIG. 3 |

FOREIGN PATENT DOCUMENTS

| | | | |
|---|---|---|---|
| 0088876 | 9/1983 | European Pat. Off. . | |
| 63-137003 | 6/1988 | Japan | 152/209 D |
| 3-14704 | 1/1991 | Japan | 152/209 R |
| 3-92403 | 4/1991 | Japan | 152/209 R |
| 3-128706 | 5/1991 | Japan | 152/209 R |
| 3-182814 | 8/1991 | Japan | 152/209 D |
| 4-218411 | 8/1992 | Japan | 152/209 D |
| 4-230407 | 8/1992 | Japan . | |
| 6-32115 | 2/1994 | Japan . | |
| 0867556 | 12/1958 | United Kingdom . | |
| 1356784 | 6/1974 | United Kingdom | 152/209 R |
| 2053783 | 2/1981 | United Kingdom . | |
| 9518022 | 7/1995 | WIPO . | |

OTHER PUBLICATIONS

Translation for Japan 3-14704.

*Primary Examiner*—Steven D. Maki
*Attorney, Agent, or Firm*—Birch, Stewart, Kolasch & Birch, LLP

[57] ABSTRACT

A pneumatic tire comprises a tread portion which is provided with a plurality of circumferential grooves extending continuously in the tire circumferential direction to axially divide the tread portion into a plurality of land portions, at least one of the land portions is provided with sipes each extending across the full width of the land portion to have a pair of open ends, each of the sipes is provided therein with at least three tie-bars to provide the bottom of the sip with at least three shallow parts in the open ends and therebetween and at least two deep parts between the shallower parts, and the depth (h2) at the shallow parts is set in the range of from 0.2 to 0.8 times the depth (h1) at the deep parts.

4 Claims, 6 Drawing Sheets

PNEUMATIC TIRE HAVING SIPES INCLUDING AT LEAST THREE TIE-BARS

The present invention relates to a pneumatic tire provided in the tread with sipes in which tie-bars are disposed.

In pneumatic tires, especially those for trucks and buses, which are as shown in FIG. 7 provided in the tread portion with sipes (s) extending between circumferential grooves (g) to improve wet performance, uneven wear is liable to occur in the land portion (a) along the sipes.

In the laid-open Japanese patent application JP-A-4-230407, a sipe (s) which is as shown in FIG. 8 provided in both ends with tie-bars (d1) is disclosed. In this proposition, however, the middle of the sipe bottom is liable to be subjected to a relatively large bending stress repeatedly from beginning to end of the tread wear life, and thus cracks are liable to occur in this middle part, and the tire durability is decreased. Further, the tie-bars are liable to tear because a large stress concentrates thereon. Furthermore, the rigidity of the land portion becomes uneven and insufficient for maneuverability.

In the laid-open Japanese patent application JP-A-6-32115, a sipe (s) which is as shown in FIG. 9 provided in the middle with tie-bars (d2) is disclosed. In this construction, however, cracks are liable to occur at the bottom in both the ends of the sipe. Further, uneven wear occurs around both ends of the sipe.

It is therefore, an object of the present invention to provide a pneumatic tire in which the damage at the sipe bottom and the uneven tread wear around the sipe ends are effectively prevented, and the tire durability and maneuverability are improved.

According to one aspect of the present invention, a pneumatic tire comprises a tread portion provided with a plurality of circumferential grooves extending continuously in the tire circumferential direction to axially divide the tread portion into a plurality of land portions, at least one of the land portions provided with sipes, each extending across the full width of the land portion to have a pair of open ends, each said sipe provided therein with at least three tie-bars to provide the bottom of the sipe with at least three shallow parts between the open ends and at least two deep parts between the shallower parts, and the depth at the shallow parts being in the range of from 0.2 to 0.8 times the depth at the deep parts.

Embodiments of the present invention will now be described in detail in conjunction with the accompanying drawings.

Figure 1:
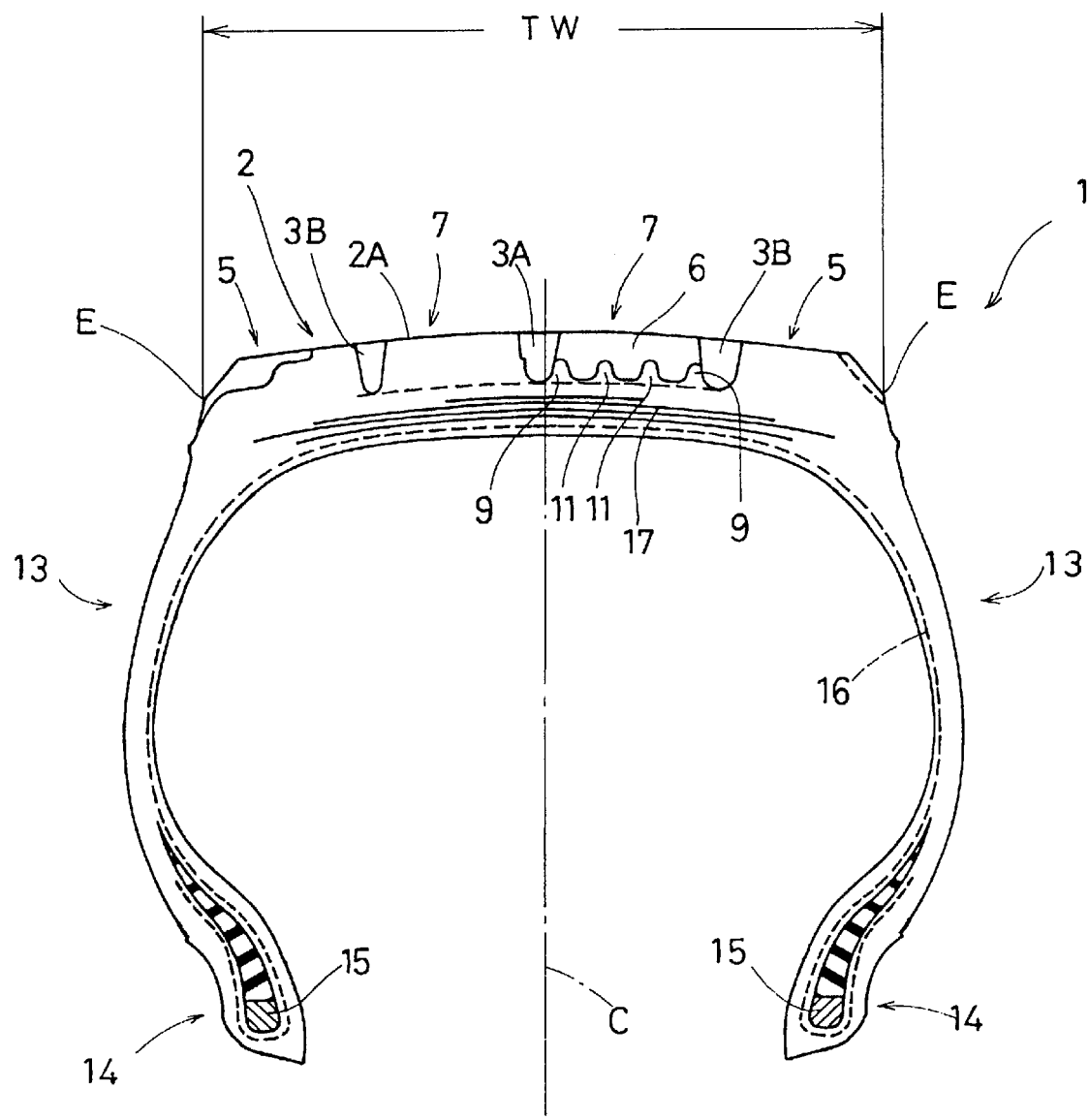
FIG. 1 is a cross sectional view of a tire according to the present invention.

In FIGS. 1 to 4, the pneumatic tire 1 comprises a tread portion 2, a pair of axially spaced bead portions 14 with a bead core 15 therein, a pair of sidewall portions 13 extending between the tread edges E and the bead portions 14, a carcass 16 extending between the bead portions 14, and a belt 17 disposed radially outside the carcass and inside a rubber tread.

The carcass 16 comprises at least one ply of cords arranged radially at an angle of from 70 to 90 degrees to the tire equator C and extending between the bead portions 14 through the tread portion 2 and sidewall portions 13 and turned up around the bead cores 15. For the carcass cords, organic fiber cords, e.g. polyester, nylon, rayon, aromatic polyamide and the like and steel cords can be used.

The belt 17 comprises at least two cross plies as breaker. For the belt cords, steel cords and organic fiber cords, e.g. nylon, polyester, rayon, aromatic polyamide and the like can be used. In this embodiment, four belt plies are disposed.

The tread portion 2 is provided with a plurality of circumferential grooves 3 (3A and 3B) extending circumferentially around the tire so as to axially divide the tread portion 2 into a plurality of land portions 5 and 7.

Preferably, the width and depth H of the circumferential grooves 3 are 0.05 to 0.12 times and 0.06 to 0.16 times the tread width TW, respectively.

Figure 2:
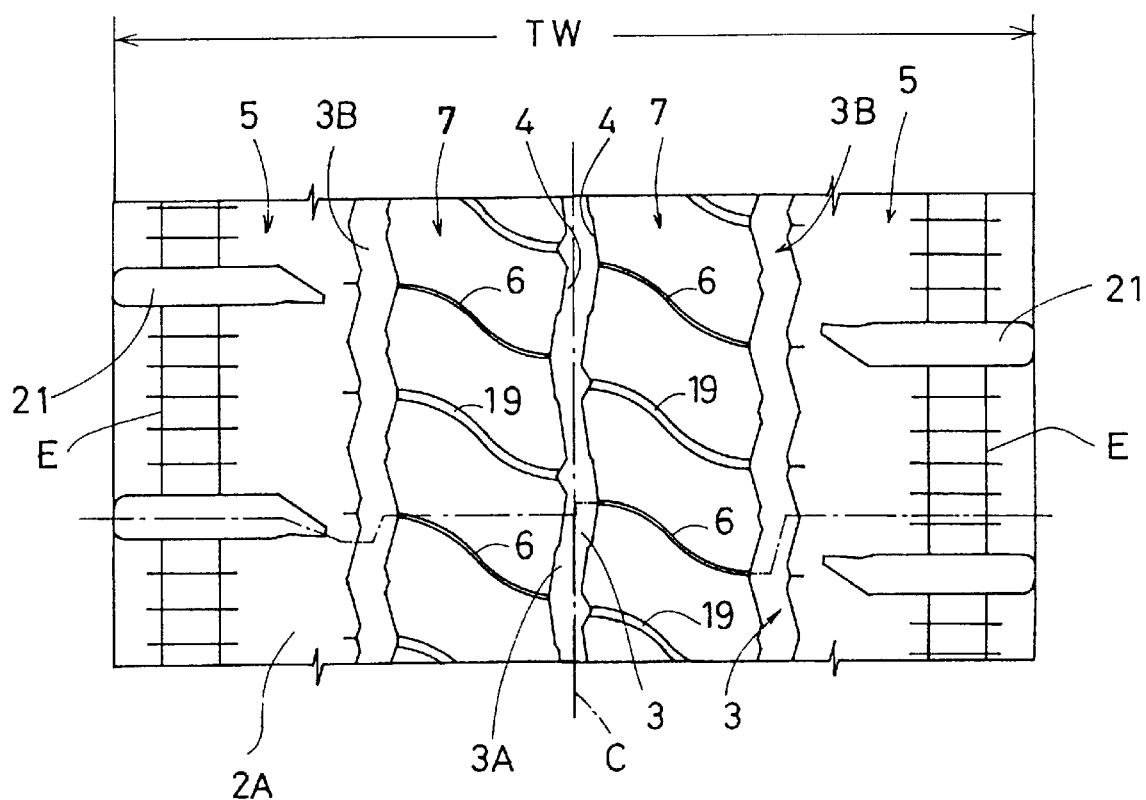
FIG. 2 is a developed plan view thereof showing an example of the tread pattern.

In the example shown in FIG. 2, a circumferential groove 3A is disposed on the tire equator C, and a pair of circumferential grooves 3B are disposed one on each side of the tire equator C. As a result, four land portions 5 and 7 are formed. The circumferential grooves 3A and 3B are a zigzag groove.

The land portions 7 defined between the circumferential grooves 3A and 3B are provided with sipes 6 extending across the full width of the land portion 7.

In this example, the land portions 5 defined between the circumferential grooves 3B and tread edges E are not provided with sipes 6 but rug grooves 21, the rug grooves 21 open to the tread edges E.

The above-mentioned land portions 7 in this example are further provided with narrow axial grooves 19 (about 3 mm width) extending across the land portion 7. The narrow axial grooves 19 have a larger width than the width of the sipes 6. The axial grooves 19 and the sipes 6 are arranged alternately and at substantially regular intervals around the circumference of the tire. The axial grooves 19 and the sipes 6 have a S-shaped configuration and extend almost parallel to each other in each land portion 7. All of the axial grooves 19 and sipes 6 are inclined in the same direction, and in the example shown in FIG. 2 they have a left side upward inclination. However, it is also possible that they have a right side upward inclination.

The sipes 6 are a narrow slit having a width (w) of from 0.5 to 1.5 mm, and a maximum depth (h1) of 0.7 to 1.0 times the depth H of the circumferential grooves 3.

Figure 4:
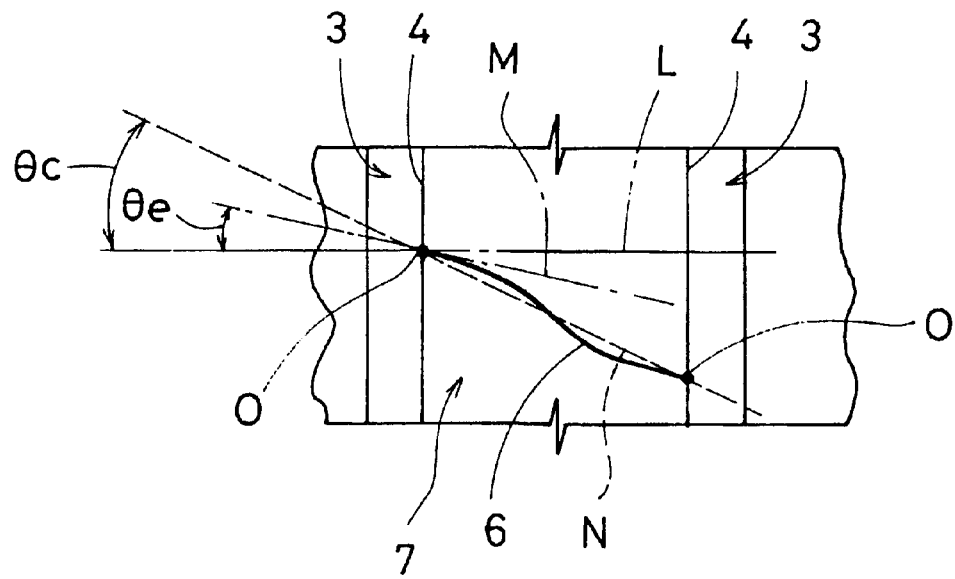
FIG. 4 shows an example of the configuration of the sipe.

As shown in FIG. 4, the inclination angle $\theta e$ of the sipe 6 at the open ends (O) is not more than 30 degrees with respect to the axial direction of the tire. Preferably, the angle $\theta e$ is not more than 20 degrees, more preferably not more than 15 degrees. If the angle $\theta e$ is more than 30 degrees, the stress concentrated on the acute angled corner formed between the groove 3 and sipe 6 becomes too large and this part is liable to be torn off. Further, the tie-bar 9 mentioned later is liable to be broken.

The nominal inclination angle $\theta c$ of the sipe 6 which is defined between a straight line N drawn between the open ends (O) and an axial line (L) is set as follows to provide lateral grip.

$\theta c - \theta e >= 10$ degrees

If the angle $\theta c$ is less than 30 degrees, the circumferential component of the sipes 6 decreases to deteriorate cornering performance under wet conditions such as on snow or an iced road surface.

By specifically limiting the inclination angles $\theta c$ and $\theta e$ as explained above and employing the S-shape configuration, the acute angled corners of the land portions 7 can be prevented from being damaged, and at the same time the cornering performance can be improved.

The sipe 6 is provided in the bottom 8 with at least three shallow parts 10 and 12 each formed by a tie-bar 9, 11. The tie-bar 9, 11 extends between the rubber blocks on both sides of the sipe and thus ties the rubber blocks with each other. One sipe 6 is therefore provided with at least three tie-bars inclusive of a pair of tie-bars 9 forming a pair of shallow parts 10 which are located in both ends of the sipe 6, and at least one, in this example two, tie-bars 11 forming shallow parts 12 which are located between the end tie-bars 9.

The depths (h2) of the shallow parts 10 and 12 measured from the top thereof to the tread 2A are set in the range of from 0.2 to 0.8 times the maximum depth (h1). The lower limit is preferably not less than 0.3, more preferably not less than 0.4. The upper limit is preferably not more than 0.7, more preferably not more than 0.6.

If h2/h1 is less than 0.2, the opening of the sipes in the ground contacting patch becomes insufficient, and thus the edge effect of the sipes decreases, and wet performance deteriorates. If h2/h1 is more than 0.8, the rigidity of the land portions decreases too much to maintain the maneuverability.

Thus, by specifically limiting the depths (h2) as above, the above-mentioned acute angled corners of the land portions 7 are prevented from being torn, and further, maneuverability under wet and dry conditions can be improved.

Figure 3:
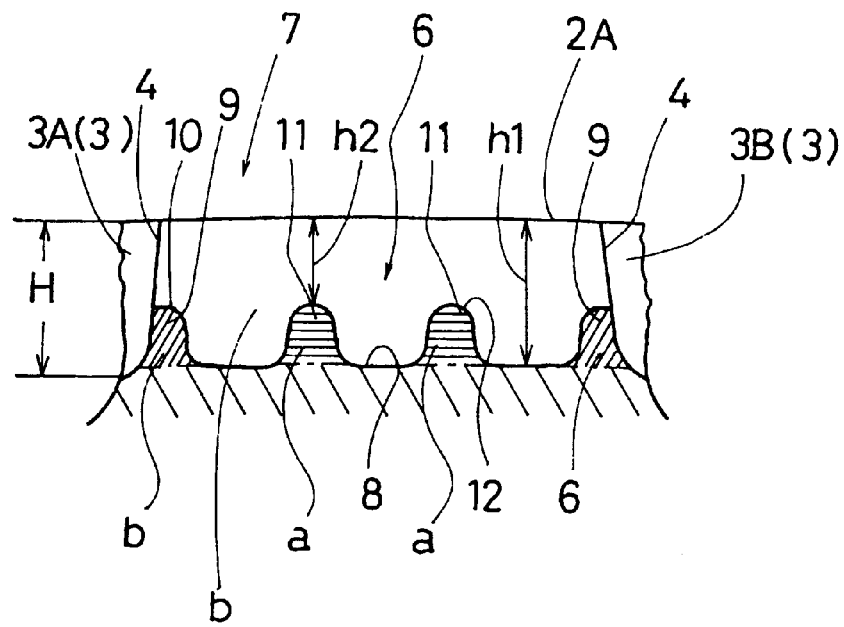
FIG. 3 is a cross sectional view of the land portion taken along the center line of a sipe.

As shown in FIG. 3, in a section taken along the center line of the sipe 6, the sectional area (b) of the end tie-bar 9 is 0.3 to 1.0 time, preferably 0.3 to 0.7 times the sectional area (a) of the middle tie-bar 11.

If b/a is less than 0.3, the side-walls 4 of the sipe 6 near the open ends (O) can not be reinforced effectively, and the rigidity of the land portion 7 as a whole decreases, and the stress is concentrated on the tie-bars 9. As a result, cracks or tear-off and uneven wear are liable to occur near the open ends (O). Further, the maneuverability and braking performance under dry conditions deteriorate.

If b/a is more than 1.0, the reinforcement in the middle part of the sipe 6 becomes insufficient, and the rigidity of the land portion 7 as a whole decreases. As a result, a stress concentrates on the tie-bars 9 rather than on the tie-bars 11, and tear and tear-off are liable to occur near and at the end tie-bars 9. Further, the maneuverability and braking performance under dry conditions deteriorate.

Preferably, the sipes 6 are further limited as follows. With respect to one sipe 6, the total number NK of the tie-bars 9 and 11, the length SN of the sipe measured along the sipe, and the maximum depth (h1) satisfy $$1 = < NK - (SN/h1) = < 5$$

more preferably, $$1 = < NK - (SN/h1) = < 3.$$

If NK−(SN/h1) is more than 5, the tie-bars are liable to be cut when the tire is demolded, and it is difficult to make a tire vulcanizing mold. Further, wet performance decreases when tread wear extends near the top of the shallow parts 10 and 11.

According to the present invention, it is also possible to dispose the sipes 6 on all the land portions 7 and 5. The sipes 6 may be a straight sipe. Further, the S-shaped wavy sipes and straight sipes may be combined in a tire. Further, in one sipe 6, the depths (h2) of the shallow parts may be different, for example between the end tie-bars 9 and the middle tie-bars 11.

A) Test 1

Figure 5:
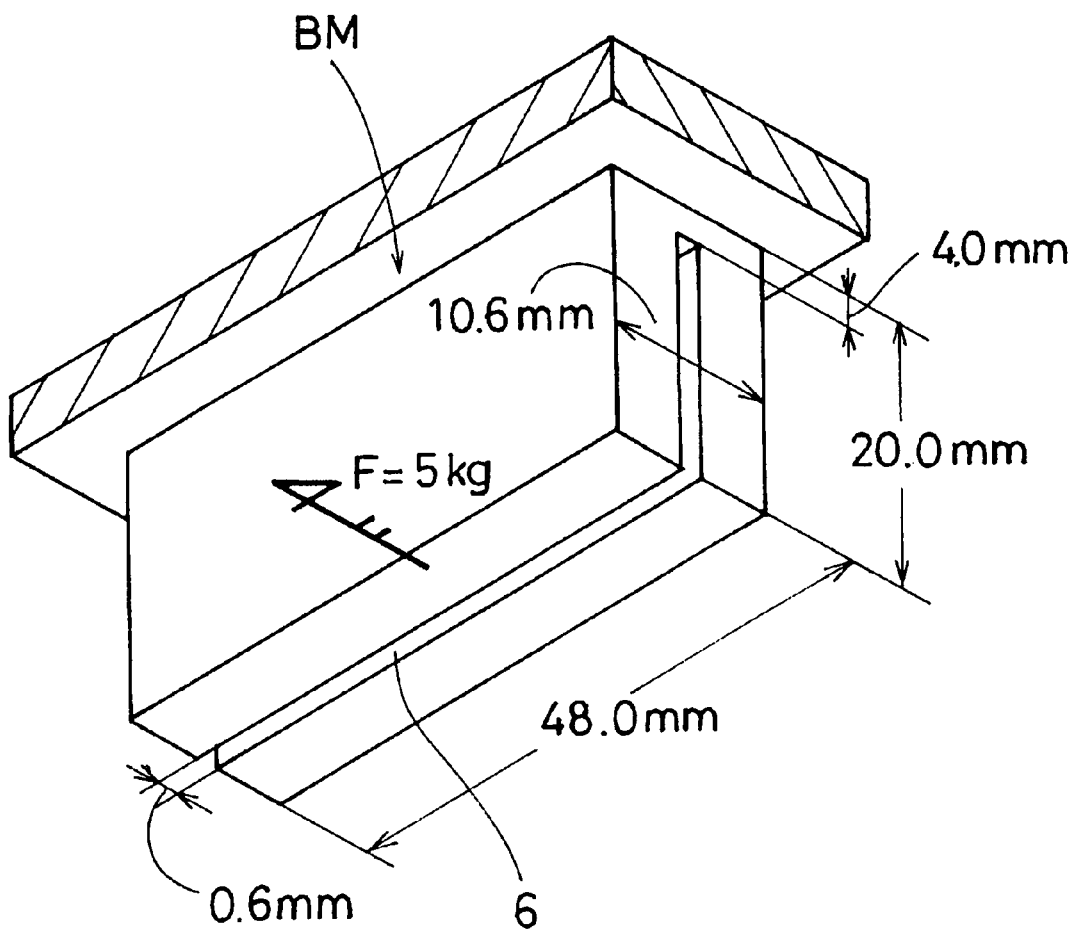
FIG. 5 is a schematic perspective view of a model of a tread rubber block with a sipe which is used to compute strain and the rigidity thereof.
Figure 6:
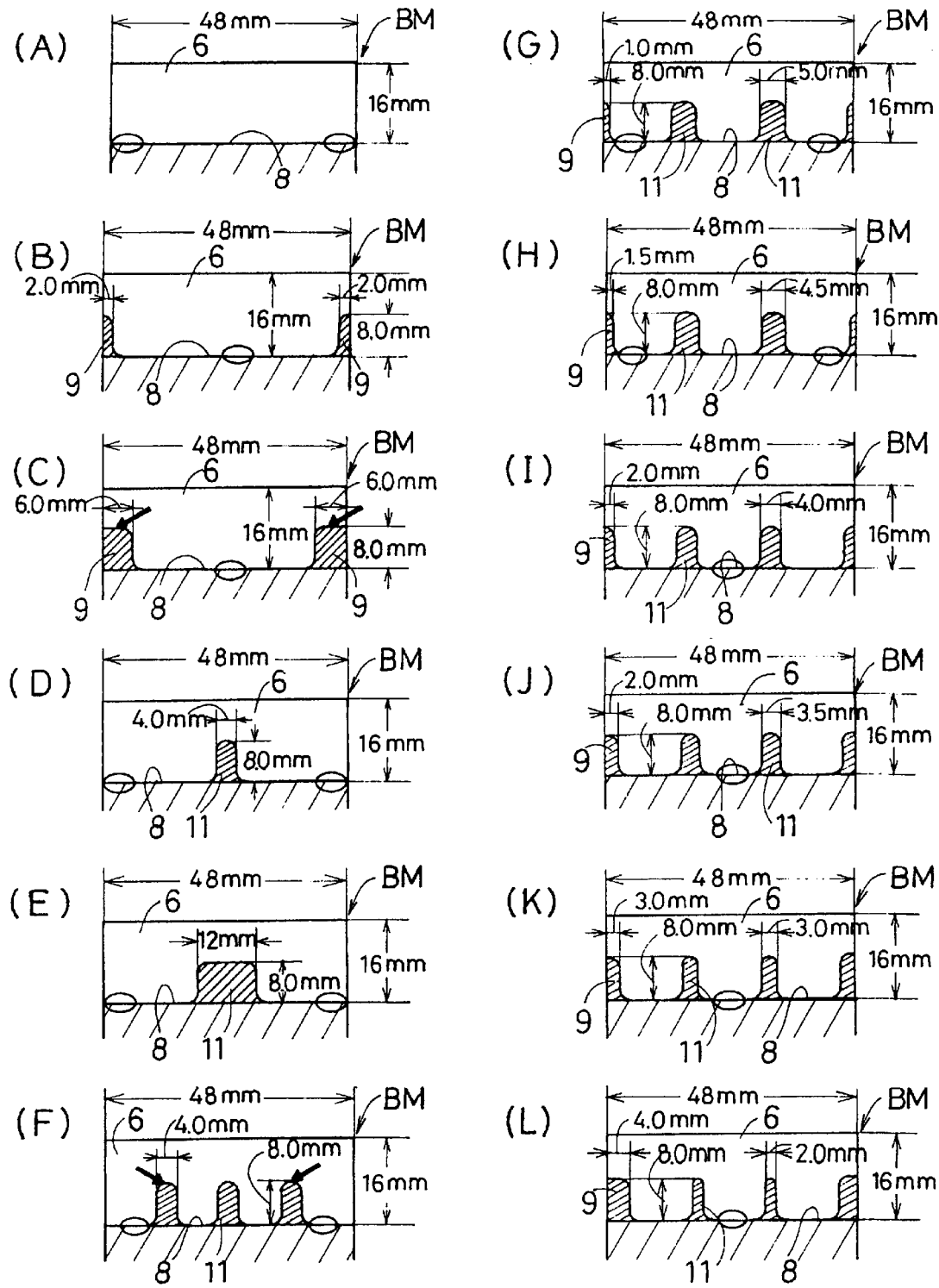
FIG. 6 shows various constructions (A) to (L) of tie-bars in a sipe used in comparison tests.
Figure 7:
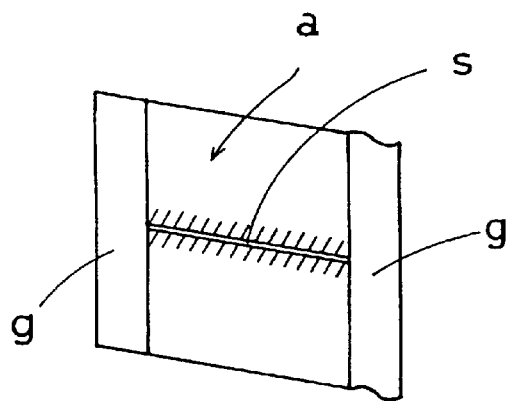
FIG. 7 is a plan view for explaining uneven wear.
Figure 8:
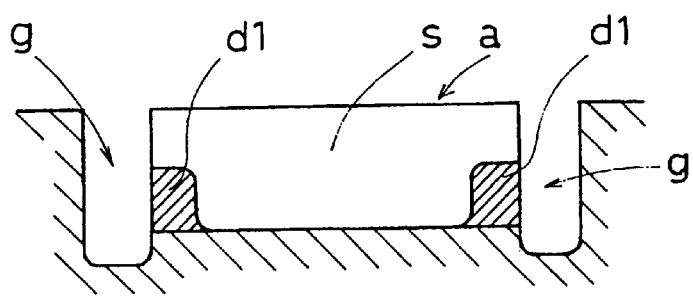
FIGS. 8 and 9 are cross sectional views showing prior art.
Figure 9:
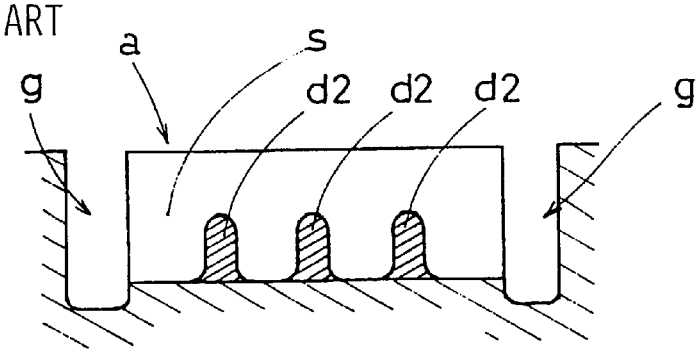

Various models of a tread rubber block BM shown in FIG. 5 provided with a sipe were made, changing the construction of tie-bars as shown in FIG. 6. On each model the strain at the bottom of the sipe was computed according to a finite element method to find the maximum strain and the position thereof. The positions of the maximum strain are marked with circles in FIG. 6. Further, the rigidity of the block BM was computed. The results are indicated in Table 1 by an index wherein the construction (A) is 100.

It was confirmed that the constructions (G to L) according to the invention were improved in the maximum strain at the sipe bottom and the block rigidity. Especially, when the b/a ratio was 0.3 to 1.0, the rigidity was effectively increased.

B) Test 2

Test tires having the structure shown in FIG. 1 and specifications shown in Table 2 were made and tested for the durability and maneuverability. (Tire size 11R22.5, Rim size 8.25×22.5)

B-1) Durability test 1

The test tires were run for 10,000 km at a speed of 20 km/h using a drum tester under an inner pressure of 8.5 kgf /sq. cm and a tire load of 6,300 kg. Then, the tires were inspected for damage of the sipes and vicinity. The results are given in Table 2.

B-2) Durability test 2

A 2-D·4 wheel type truck provided on all the wheels with test tires was run on asphalt roads under 30,000 km (24,000 km for dry conditions and 6,000 km under wet conditions). (Inner pressure: 8.0 kgf /sq. cm) Then, the tires were inspected for uneven wear and damage at the sipe bottom.

In table 2, as the uneven wear, the maximum wear at the sipes' ends opened into the circumferential grooves is shown.

B-3) Maneuverability test

Using the above-mentioned 2-D·4 wheel type truck, the maneuverability during cornering was evaluated into five ranks by the test driver's feeling. The test results are also shown in Table 2 where the higher the rank number, the better the maneuverability.

It was confirmed that the cornering performance improves as the block rigidity increases.

As described above, in the pneumatic tire according to the present invention, the sipe is provided with a pair of end tie-bars and at least one middle tie-bar of which sizes are specifically limited. Uneven wear along the sipe and cracks at the sipe bottom can be prevented to improve the tire durability, and also the maneuverability can be improved.

TABLE 1

| Construction (FIG. 6) | A | B | C | D | E | F | G | H | I | J | K | L |
|---|---|---|---|---|---|---|---|---|---|---|---|---|
| No. of Tie-bar | | | | | | | | | | | | |
| End | 0 | 2 | 2 | 0 | 0 | 0 | 2 | 2 | 2 | 2 | 2 | 2 |
| Middle | 0 | 0 | 0 | 1 | 1 | 3 | 2 | 2 | 2 | 2 | 2 | 2 |
| Area ratio b/a | — | — | — | — | — | — | 0.2 | 0.3 | 0.5 | 0.7 | 1 | 2 |

TABLE 1-continued

| Construction (FIG. 6) | A | B | C | D | E | F | G | H | I | J | K | L |
|---|---|---|---|---|---|---|---|---|---|---|---|---|
| Max. strain | 100 | 78.7 | 70.1 | 90.5 | 86.3 | 72.2 | 68.9 | 66.3 | 62.4 | 65.8 | 67 | 68.1 |
| Rigidity | 100 | 112 | 131 | 111 | 129 | 133 | 133 | 133 | 135 | 134 | 133 | 133 |

TABLE 2

| Tire | Ref. 1 | Ref. 2 | Ex. 1 | Ex. 2 | Ex. 3 | Ex. 4 |
|---|---|---|---|---|---|---|
| Carcass | \multicolumn{6}{c}{a single ply of steel cords} | | | | | |
| Cord angle | \multicolumn{6}{c}{90 degrees to tire equator} | | | | | |
| Belt | \multicolumn{6}{c}{four plies of steel cords} | | | | | |
| Cord angle | \multicolumn{6}{c}{0/18/−18/−18 degrees to tire equator (radially inside to outside)} | | | | | |
| Tie-bar (FIG. 6) | (C) | (F) | (H) | (I) | (J) | (K) |
| Area ratio b/a | — | — | 0 | 0.5 | 0.7 | 1 |
| Durability test 1 | | | | | | |
| Damage | tear *1 | undulation *2 | non | non | non | non |
| Durability test 2 | | | | | | |
| Unevenwear (mm) | 0 | 1.5 | 0 | 0 | 0 | 0 |
| Damage at bottom | undulation *3 | undulation *4 | non | undulation | undulation | undulation |
| Maneuverability | 5 | 5 | 6 | 6 | 6 | 5 |

Damaged positions are:
*1) pointed by an arrow in the section (C) of FIG. 6
*2) pointed by an arrow in the section (F) of FIG. 6
*3) marked with a circle in the section (C) of FIG. 6
*4) marked with a circle in the section (F) of FIG. 6.

What is claimed is:

1. A pneumatic tire comprising
a tread portion provided with a plurality of circumferential grooves extending continuously in the tire circumferential direction to axially divide the tread portion into a plurality of land portions,
at least one of the land portions provided with sipes each extending across the full width of the land portion to have a pair of open ends,
each said sipe provided therein with at least three tie-bars to provide the bottom of the sipe with at least three shallow parts,
a depth (h2) of the shallow parts being in the range of from 0.2 to 0.8 times a depth (h1) of deep parts between the shallow parts,
said at least three tie-bars including a pair of outside tie-bars each located at one of the open ends and at least one inside tie-bar located therebetween, and
a sectional area (b) of each outside tie-bar being in the range of from 0.3 to 0.7 times a sectional area (a) of said at least one inside tie bar,
each said sipe having an S-shaped configuration wherein an inclination angle $\theta_e$ of the sipe at the open end is less than 30 degrees with respect to the tire axial direction, and there also being a nominal inclination angle $\theta_c$ defined as the angle of a straight line drawn between the open ends of the sipe with respect to the tire axial direction, the difference $\theta_c - \theta_e$ between said nominal inclination angle $\theta_c$ and said inclination angle $\theta_e$ is not smaller than 10 degrees,
said at least one of the land portions provided with narrow axial grooves alternately with said sipes, and
said axial grooves and said sipes being almost parallel with each other and said narrow axial grooves having a larger width than the width of the sipes.

2. The pneumatic tire according to claim 1, wherein each sipe has a width in the range of from 0.5 to 1.5 mm.

3. The pneumatic tire according to claim 1, wherein said at least three tie-bars are at least 4 tie-bars, one of said tie-bars being disposed at each open end.

4. The pneumatic tire according to claim 2, wherein said at least three tie-bars are at least 4 tie-bars, one of said tie-bars being disposed at each open end.

* * * * *